United States Patent
Ichikawa (10) Patent No.: US 11,416,103 B2
(45) Date of Patent: Aug. 16, 2022

(54) PROXIMITY DETECTION DEVICE

(71) Applicant: ALPS ALPINE CO., LTD., Tokyo (JP)

(72) Inventor: Teiichi Ichikawa, Iwaki (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 17/363,327

(22) Filed: Jun. 30, 2021

(65) Prior Publication Data

US 2022/0011877 A1 Jan. 13, 2022

(30) Foreign Application Priority Data

Jul. 7, 2020 (JP) .............................. JP2020-116858

(51) Int. Cl.
*G06F 3/041* (2006.01)
*G06F 3/03* (2006.01)
*G06F 3/042* (2006.01)

(52) U.S. Cl.
CPC ........ *G06F 3/04186* (2019.05); *G06F 3/0308* (2013.01); *G06F 3/0421* (2013.01)

(58) Field of Classification Search
CPC .. G06F 3/0308; G06F 3/04186; G06F 3/0421; G06F 3/04166; G06F 2203/04108
See application file for complete search history.

(56) References Cited

U.S. PATENT DOCUMENTS

| | | | | |
|---|---|---|---|---|
| 2013/0265248 A1* | 10/2013 | Nagahara | ................. | G06F 3/011 345/173 |
| 2014/0015950 A1* | 1/2014 | Kobayashi | ............ | G06F 3/0428 348/77 |
| 2014/0253512 A1* | 9/2014 | Narikawa | ............. | G06F 3/0304 345/175 |
| 2016/0334883 A1* | 11/2016 | Kim | ....................... | B60K 37/06 |
| 2017/0329458 A1 | 11/2017 | Kanemaru et al. | | |
| 2018/0052564 A1* | 2/2018 | Koseki | .................. | G06F 3/0412 |
| 2020/0209951 A1 | 7/2020 | Ikeda et al. | | |

FOREIGN PATENT DOCUMENTS

| | | |
|---|---|---|
| JP | 2019-074465 | 5/2019 |
| JP | 2019-74465 A | 5/2019 |
| WO | 2017/013186 A1 | 1/2017 |

OTHER PUBLICATIONS

Extended European Search Report dated Dec. 9, 2021 in EP Application No. 21181733.3.

\* cited by examiner

*Primary Examiner* — David Tung
(74) *Attorney, Agent, or Firm* — Crowell & Moring, LLP (57) ABSTRACT

Implementations of a proximity detection device according to the present disclosure include a plurality of light emitting elements and a plurality of light receiving elements arranged in a lower portion of a touch panel display. The proximity detection device detects an object that is in proximity by reflected light received by the light receiving elements when irradiation light from the light emitting elements is reflected by the object. Implementations of a proximity detection device includes a drive circuit sequentially driving the plurality of light emitting elements, a measurement circuit measuring detection levels of the light receiving elements when the plurality of light emitting elements sequentially emit light, respectively, and a control unit having a function to estimate a position in the horizontal direction from a plurality of measurement results and correct the estimated position.

5 Claims, 9 Drawing Sheets

PROXIMITY DETECTION DEVICE

RELATED APPLICATIONS

The present application claims priority to Japanese Patent Appln. No. 2020-116858, filed Jul. 7, 2020, the entire disclosure of which is hereby incorporated by reference.

BACKGROUND OF THE DISCLOSURE

1. Field of the Disclosure

The present disclosure relates to a proximity detection device detecting whether or not there is an object that is in proximity thereto, and more particularly, to a proximity detection device installed in an electronic device such as a touch panel display.

2. Description of the Related Art

In recent years, as an input using a touch panel display, a gesture input, and the like are practically used, there has been an increase in mounting a proximity detection device on an in-vehicle display. The proximity detection device detects an object that is in proximity thereto, for example, using infrared LEDs emitting infrared light and light receiving elements such as photodiodes, by irradiating the object with the infrared light and receiving reflected light thereof (e.g., refer to JP 2019-74465 A).

Figure 1A:
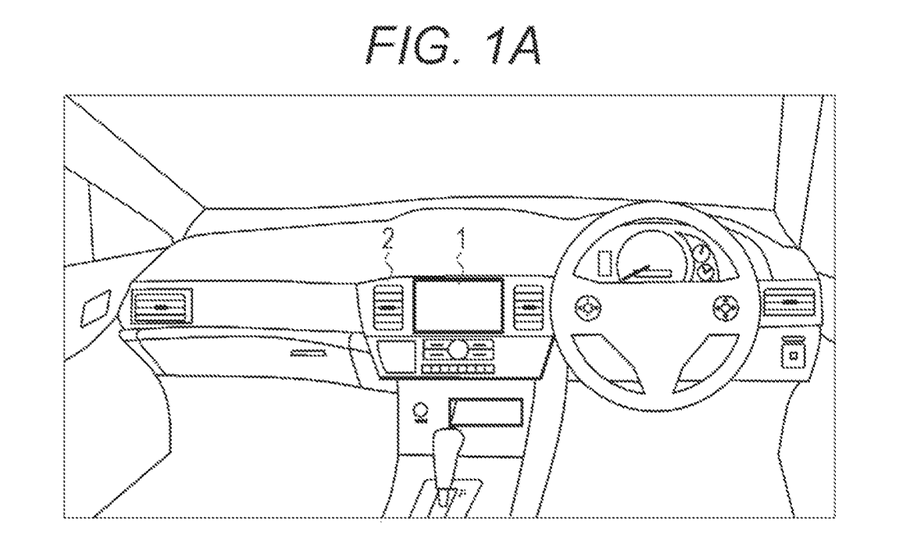
FIG. 1A is a diagram illustrating an example in which a display with a conventional proximity detection device mounted thereon is arranged.
Figure 1B:
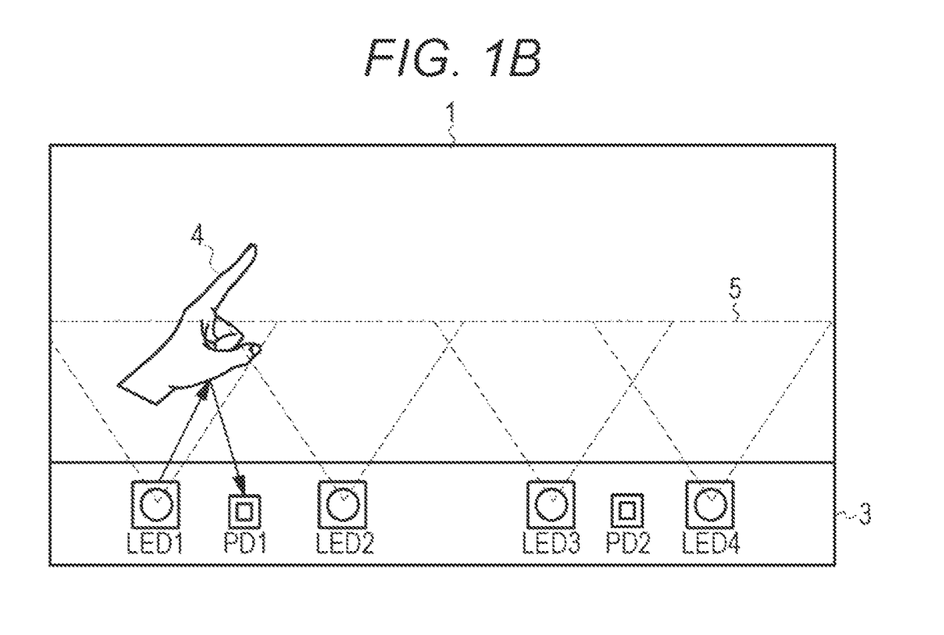
FIG. 1B is a diagram illustrating an example in which an operation object is detected by the conventional proximity detection device.

In recent years, there has been an increase in mounting a proximity detection device on an in-vehicle display. An example of the proximity detection device is illustrated in FIGS. 1A and 1B. A touch panel display 1 is disposed in a center console 2 in a middle portion between a driver's seat and a front passenger's seat, and a proximity detection device for detecting a gesture operation or the like of a driver or a passenger is mounted on the display 1. As illustrated in FIG. 1B, the proximity detection device includes four light emitting elements LED1, LED2, LED3, and LED4, and two light receiving elements PD1 and PD2, which are provided in a lower portion 3 of the display 1 (they will be collectively referred to as light emitting elements LED and light receiving elements PD). The light emitting elements LED and the light receiving elements PD are arranged in a substantially linear shape in the lower portion 3 of the display 1, with the light receiving element PD1 being disposed between the light emitting elements LED1 and LED 2 and the light receiving element PD2 being disposed between the light emitting elements LED 3 and LED 4. The light emitting elements LED are light emitting diodes emitting infrared rays, and the light receiving elements PD are photodiodes or phototransistors receiving reflected light of the infrared rays.

The light emitting element LED irradiates infrared light in front of the display 1. When an operation object (such as a hand or a finger) 4 of a user approaches in front of the display 1, the irradiation light 5 from the light emitting element LED is reflected by the operation object 4, and the light receiving element PD receives the reflected light, thereby detecting the proximity of the operation object 4.

Figure 2:
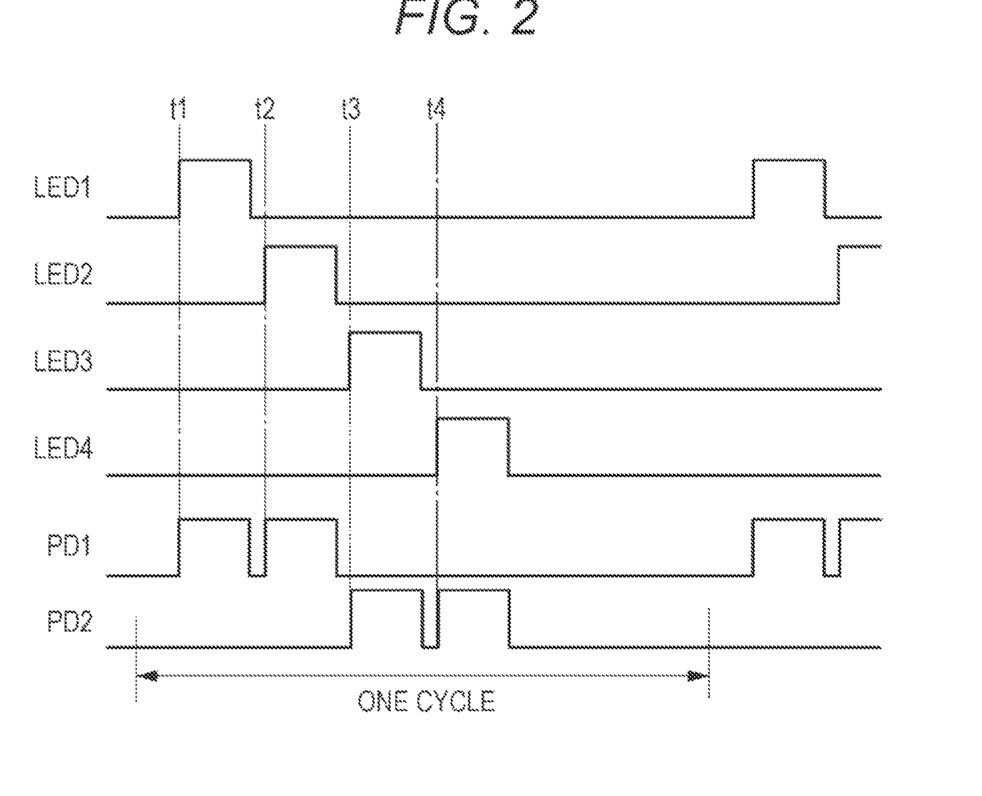
FIG. 2 is a diagram illustrating timings at which light emitting elements and light receiving elements are driven in the conventional proximity detection device.

FIG. 2 illustrates operation timings of the light emitting elements LED and the light receiving elements PD. The light emitting elements LED1, LED2, LED3, and LED4 are sequentially driven at timings t1, t2, t3, and t4 so that respective light emissions thereof do not overlap each other. The light receiving element PD1 is controlled to receive light at timings synchronized with periods during which the light emitting element LED1 and the light emitting element LED2 emit light, and the light receiving element PD2 is controlled to receive light at timings synchronized with periods during which the light emitting element LED3 and the light emitting element LED4 emit light. That is, light reflected when the light emitting element LED1 emits light is measured by the light receiving element PD1 (LED1→PD1), light reflected when the light emitting element LED2 emits light is measured by the light receiving element PD1 (LED2→PD1), light reflected when the light emitting element LED3 emits light is measured by the light receiving element PD2 (LED3→PD2), and light reflected when the light emitting element LED4 emits light is measured by the light receiving element PD2 (LED4→PD2). These four measurements are operated as one cycle.

Figure 3:
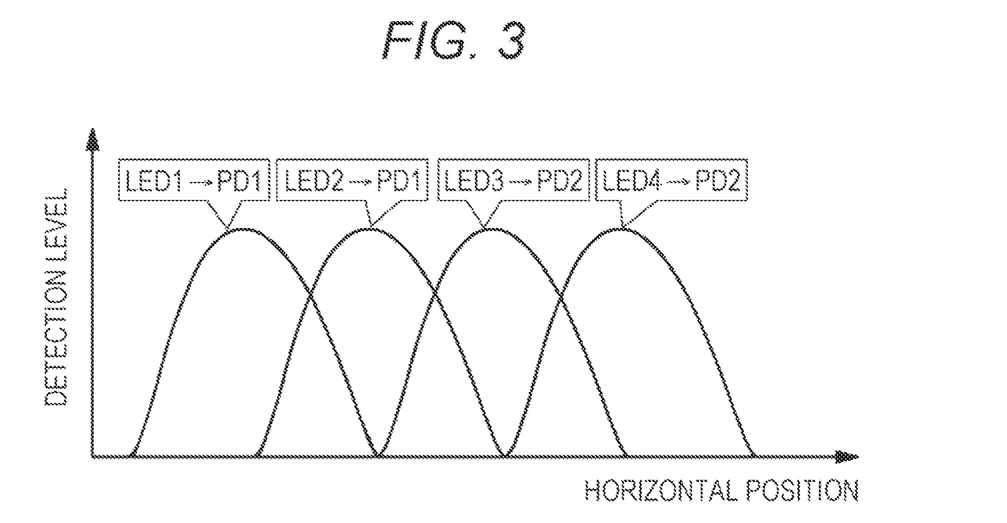
FIG. 3 is a diagram illustrating detection levels of the light receiving elements when the operation object moves horizontally.

In a case where the light emitting elements and the light receiving elements are arranged to be almost equidistant from one another, when the operation object 4 horizontally moves in front of a screen, detection levels of the light receiving elements PD1 and PD2 are substantially equal to each other in one cycle as illustrated in FIG. 3. In the display having such a proximity detection function, a horizontal position of the operation object 4 can be estimated on the basis of a distribution of reflected light detected when the respective light emitting elements LED emit light.

Figure 4A:
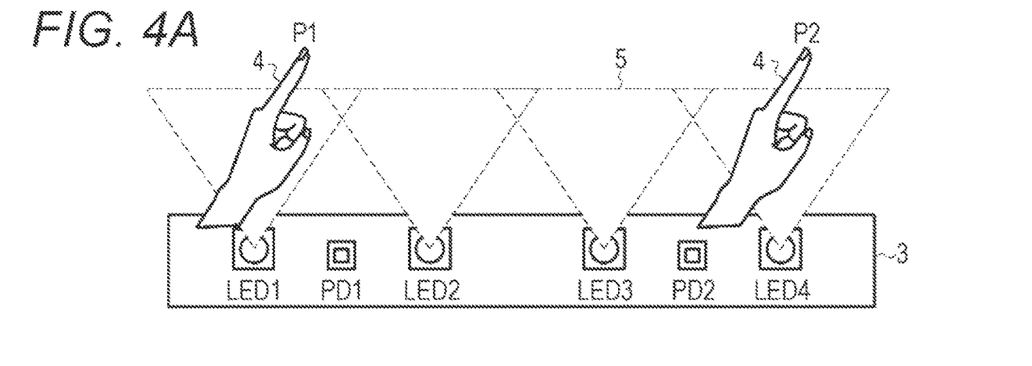
FIGS. 4A to 4D are diagrams illustrating detection levels of the light receiving elements in one cycle when the operation object approaches positions P1 and P2, and estimated positions calculated from a distribution of the detection levels.
Figure 4B:
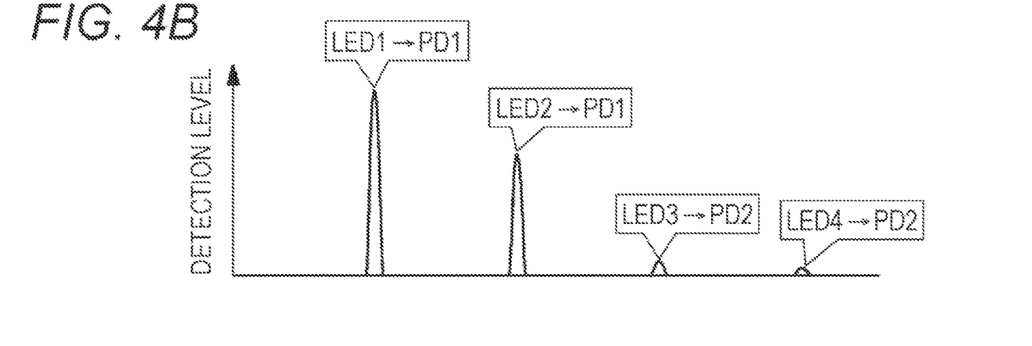
Figure 4C:
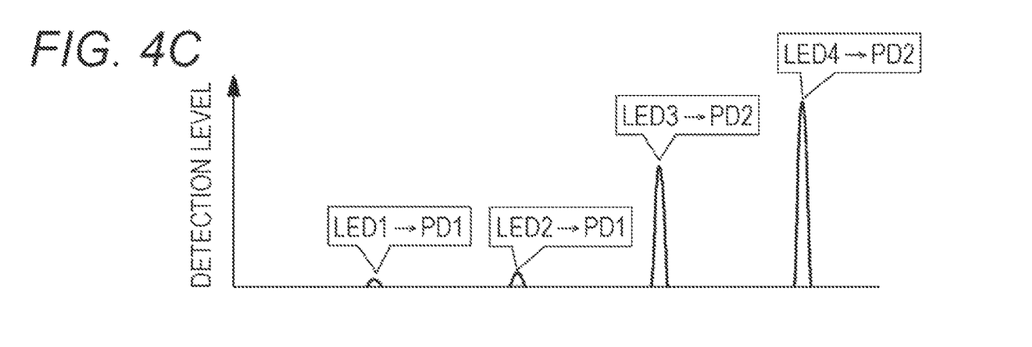
Figure 4D:
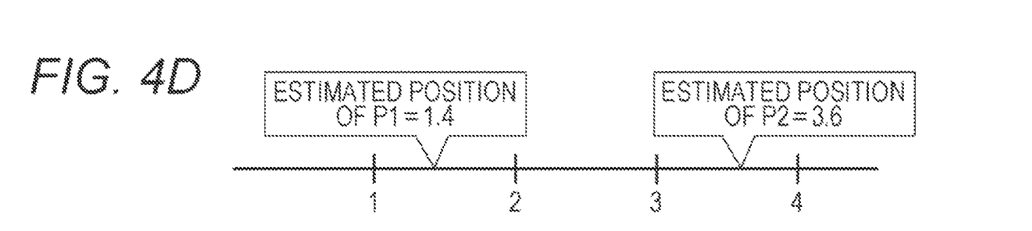

FIG. 4A illustrates the operation object 4 positioned at P1 and at P2, FIG. 4B illustrates detection levels of the light receiving elements PD when the operation object 4 approaches the position P1 on the left side of the screen, FIG. 4C illustrates detection levels of the light receiving elements PD when the operation object 4 approaches the position P2 on the right side of the screen, and FIG. 4D illustrates estimated positions G of the operation object 4 in a horizontal direction.

The position P1 is in the vicinity of the light emitting element L1. Therefore, the detection level of the light receiving element PD1 when the light emitting element LED1 emits light is largest, and the detection levels when the light emitting elements LED2, LED3, and LED4 emit light gradually decrease. In addition, the position P2 is in the vicinity of the light emitting element L4. Therefore, the detection level when the light emitting element LED4 emits light is largest, and the detection levels when the light emitting elements LED3, LED2, and LED1 emit light gradually decrease.

As a means for quantifying the horizontal position of the detection object from such a distribution of detection levels, a centroid calculation method is generally effective. This calculation method will be described. For example, when coordinates of horizontal positions detected by the light emitting elements LED1, LED2, LED3, and LDE4 are set as x1, x2, x3, and x4, and the respective light emitting elements LEDs are set to emit light in the same amount, a horizontal position of the detection object can be estimated from Equation (1). A1, A2, A3, and A4 are respective detection levels when the light emitting elements LED1, LED2, LED3, and LED4 emit light.

[Equation 1]

$$G = \frac{(x1 * A1 + x2 * A2 + x3 * A3 + x4 * A4)}{(A1 + A2 + A3 + A4)} \qquad (1)$$

Here, when x1=1, x2=2, x3=3, and x4=4 with x1 to x4 being almost equidistant from one another, Equation (1) is expressed as Equation (2).

[Equation 2]

$$G = \frac{(1*A1 + 2*A2 + 3*A3 + 4*A4)}{(A1 + A2 + A3 + A4)} \qquad (2)$$

From Equation (2), the estimated position G can be obtained in a range of 1≤G≤4. If the detection levels when the operation object 4 approaches the position P1 are A1=2000, A2=700, A3=100, and A4=10, the estimated position G is calculated as 1.3 from Equation (2). If the detection levels when the operation object 4 approaches the position P2 are A1=10, A2=100, A3=700, and A4=2000, the estimated position G is calculated as 3.7.

By estimating the horizontal position of the operation object as described above, for example, in a case where the horizontal position changes by a predetermined value or more within a prescribed time period (for example, one second), it can be determined that a swipe operation has been performed. This can be applied to a gesture operation.

Figure 5:
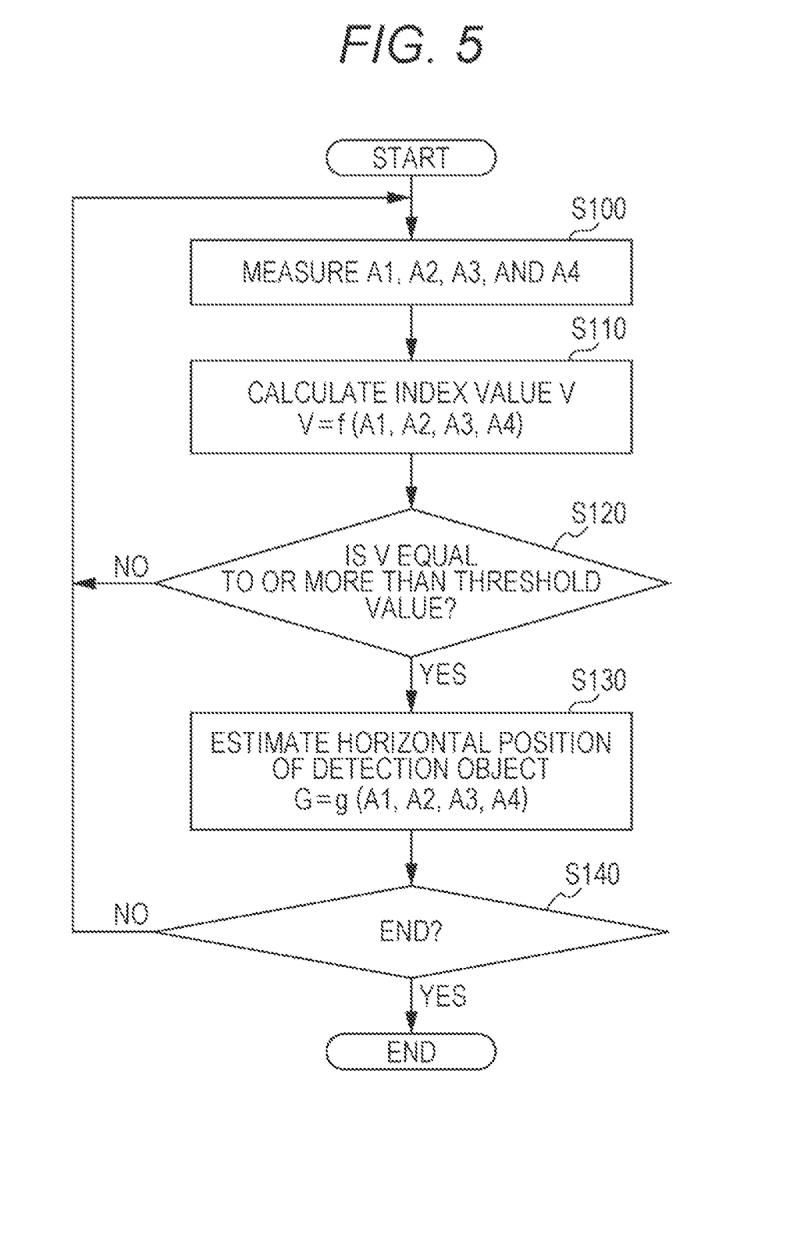
FIG. 5 is a flowchart illustrating an operation for estimating a horizontal position in the conventional proximity detection device.

The conventional operation for estimating a horizontal position as described above is illustrated in a flowchart of FIG. 5. First, values A1, A2, A3, and A4 measured by the light receiving elements PD1 and PD2 when the light emitting elements LED1, LED2, LED3, and LED4 sequentially irradiate light, respectively, are acquired (S100), and an index value V for evaluating whether or not there is a detection object sufficient for performing position determination is calculated from the measured values (S110). The index value V may be calculated as, for example, a maximum value of the measured values A1, A2, A3, and A4 of the detection levels. When the index value V is more than a predetermined threshold value (S120), it is determined that there is a meaningful detection object, and a horizontal position of the detection object is estimated (S130). The position is estimated, for example, by calculating an estimated position G of the detection object in the horizontal direction using Equation (1) or (2) for calculating a centroid as described above. When the index value V is less than the threshold value, position estimation is not performed, and the process returns to a next measurement.

In recent years, in-vehicle displays have tended to be large-sized, and it is not unusual that a display having a size of 15 inches or more, beyond more than 10 inches, is mounted in a center console. In such a large-screen display, the estimation of the horizontal position based on the proximity detection as described above may not work normally depending on a position of an operation.

Figure 6A:
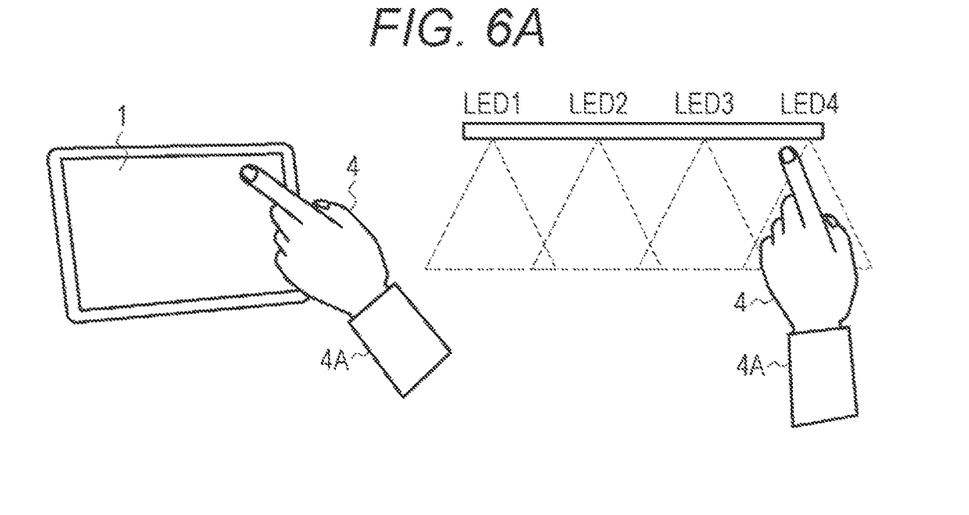
FIG. 6A is a diagram illustrating an example of operation at a position close to a driver.
Figure 6B:
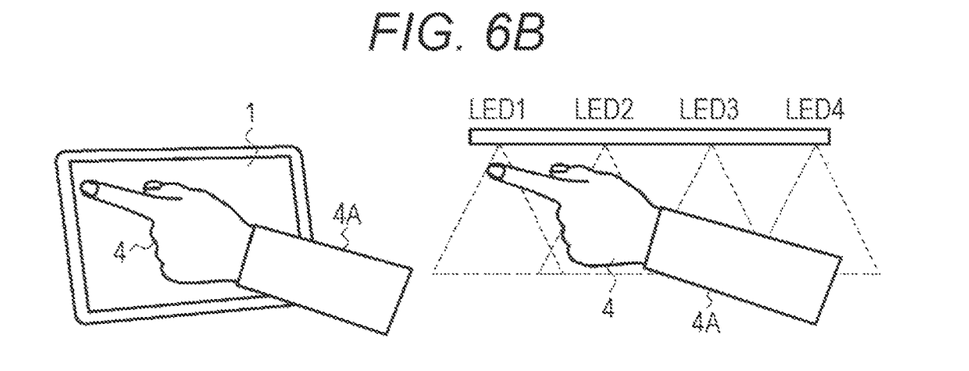
FIG. 6B is a diagram illustrating an example of operation on a side far away from the driver.
Figure 6C:
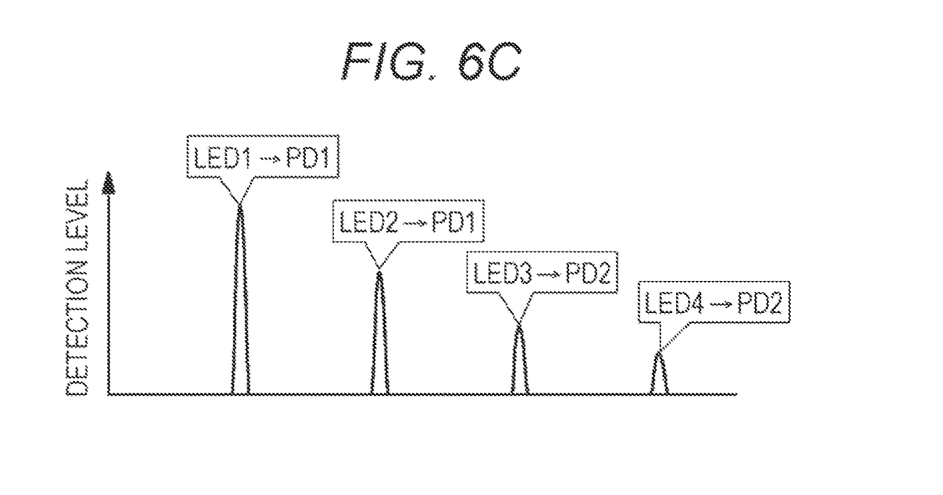
FIG. 6C is a diagram illustrating detection levels in one cycle at the time of the operation at the position far away from the driver.

FIGS. 6A to 6C illustrate an example in which the driver operates the large-screen display. When the screen of the display 1 is operated at a position relatively close to the driver as in FIG. 6A, detection levels of reflected light detected by the light receiving element PD are larger when the light emitting elements LED4 and LED3 emit light, and the detection levels of reflected light are much smaller when the light emitting elements LED2 and LED1 emit light as described above.

On the other hand, when the screen of the display 1 is operated at a position relatively far away from the driver on the front passenger's seat side as in FIG. 6B, since the screen is large, an arm portion 4A of the driver is close to the screen, resulting in an increase in reflected light when the light emitting elements LED2, LED3, and LED4 emit light. Accordingly, the detection levels at that time are larger than those in FIG. 4B. This state is illustrated in FIG. 6C.

In the calculating equation for estimating a horizontal position, the increase in the values of the detection levels A2, A3, and A4 influences an estimated position G. The estimated position G is calculated as 1.33 from the detection levels A1=2000, A2=700, A3=100, and A4=10 as described with reference to FIG. 4B. However, when the detection levels change to, for example, A2=500 and A3=400 due to the influence of reflection by the arm portion 4A, the estimated position G is 1.81, resulting in a large error in the estimated position G.

When determining a swipe operation from the estimated position G, in a case where it is determined that a swipe operation has been performed if there is a certain amount or more of position movement (for example, 2.1 or more) for one second, a calculation result when the operation object 4 moves from a position of FIG. 6A to a position of FIG. 6B should be originally determined as the swipe operation with a movement amount of "3.8"→"1.33". However, the error in the estimated position G causes a calculation result as a movement amount of "3.8"→"1.81", which is a move amount insufficient to determine that there has been a swipe operation. As a result, the gesture operation cannot be recognized.

Figure 7A:
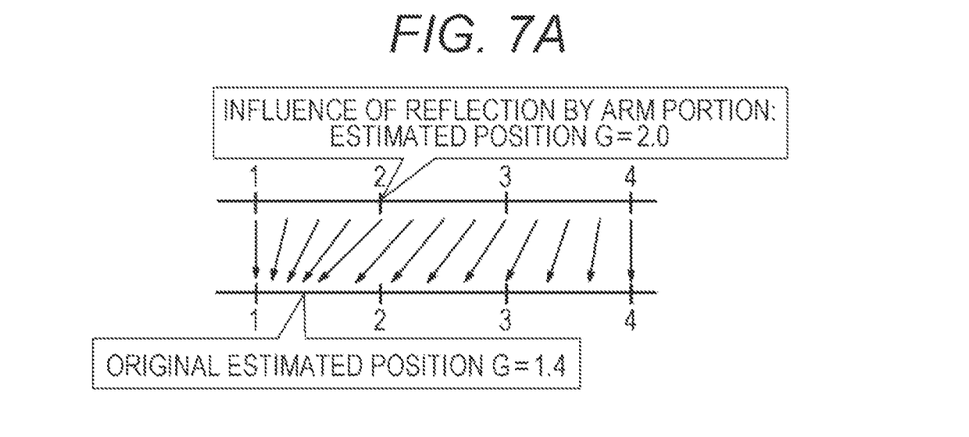
FIG. 7A is a diagram illustrating a method of correcting an estimated position through mapping transformation.
Figure 7B:
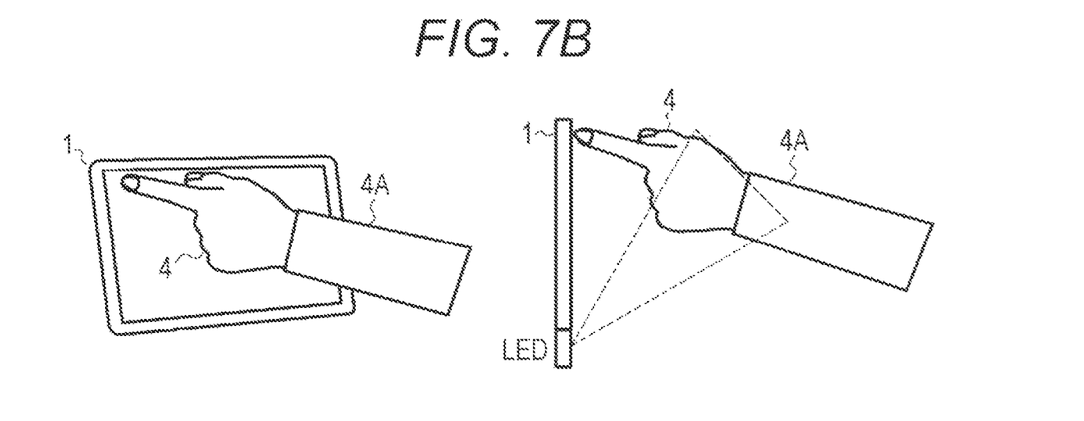
FIG. 7B is a diagram illustrating an example in which a screen is operated on an upper portion thereof.
Figure 7C:
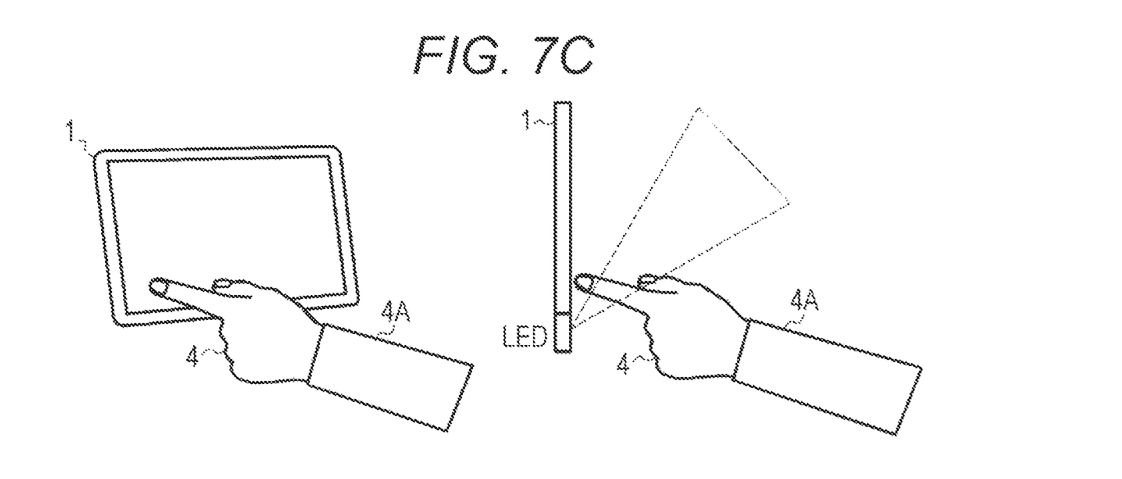
FIG. 7C is a diagram illustrating an example in which a screen is operated on a lower portion thereof.

It may be considered at first thought that such a problem can be easily coped with by setting a movement amount for detecting a swipe as being small or performing mapping transformation with respect to the detected position, for example, as illustrated in FIG. 7A. This correction method is effective when the operation object operates the screen of the display 1 at a high position as illustrated in FIG. 7B because the arm portion 4A reflects irradiation light. However, when the operation object operates the screen of the display 1 at a relatively low position as illustrated in FIG. 7C, such a correction is not necessary even when the screen of the display 1 is operated at a position on the front passenger's seat side because irradiation light is not influenced by the arm portion 4A. Rather, such a correction causes a problem that a swipe operation is erroneously detected, for example, even by an operation for regulating an air conditioner, which is usually provided below the display, or doing the like. In order to prevent this problem, it is possible to change processing depending on a position of the arm in a height direction. In that case, however, sensors for another light emitting element and another light receiving element for detecting the position in the height direction are required, leading to an increase in hardware.

An objective of the present disclosure is to solve such a conventional problem and to provide a proximity detection device capable of more accurately estimating a position in a horizontal direction.

SUMMARY

In implementations of the present disclosure, a proximity detection device detects an object that is in proximity thereto using a plurality of light emitting elements and light receiving elements that receive reflected light obtained by reflection of irradiation light from corresponding light emitting elements of the plurality of light emitting elements by the object.

Implementations of a proximity detection device may include: a drive unit sequentially driving the plurality of light emitting elements that are arranged linearly in a horizontal direction; a measurement unit measuring detection levels of the light receiving elements when the plurality of light emitting elements sequentially emit light, respectively; an estimation unit estimating a position of the object in the horizontal direction on the basis of a plurality of measurement results of the measurement unit; and a correction unit correcting the position estimated by the estimation unit. The correction unit may correct the estimated position so that a larger correction is made as the estimated position is closer to one side in the horizontal direction, and a smaller correction is made as the estimated position is closer to the other side opposite to the one side.

In some implementations, the correction unit may calculate a peak position of the detection levels on the basis of the measurement results of the measurement unit, such that the estimated position is corrected on the basis of the calculated peak position.

In some implementations, the correction unit may determine a weighting coefficient so that a correction amount based on the peak position is larger as the peak position is closer to the one side and is smaller as the peak position is closer to the other side.

In some implementations, the estimation unit may calculate the estimated position by calculating a centroid between horizontal coordinates detected by respective detection levels of the plurality of light emitting elements and the plurality of measurement results of the measurement unit.

In some implementations, the correction unit may correct the estimated position according to $(1-w) \times G + w \times P$, where $w$ is the weighting coefficient, $G$ is the estimated position, and $P$ is the peak position.

In some implementations, the plurality of light emitting elements and light receiving elements may be disposed in a lower portion of a touch panel display, the light receiving elements may include a first light receiving element disposed between first and second light emitting elements and a second light receiving element disposed between third and fourth light emitting elements, and the measurement unit may measure detection levels of the first light receiving element when the first and second light emitting elements emit light, respectively, and measure detection levels of the second light receiving element when the third and fourth light emitting elements emit light, respectively.

In some implementations, the display may be disposed between a driver's seat and a front passenger's seat, and the one side may be a front passenger's seat side and the other side may be a driver's seat side.

In implementations of the present disclosure, a position estimated from each measurement result of the measurement unit is corrected so that a larger correction is made as the estimated position is closer to one side in the horizontal direction and a smaller correction is made as the estimated position is closer to the other side opposite to the one side, thereby making it possible to suppress an erroneous detection as to the proximity of an object directed from the one side to the other side and accurately estimate a horizontal position.

DESCRIPTION OF THE DRAWINGS

Implementations of the present disclosure are described below. One form of a proximity detection device according to the present disclosure includes a light emitting element and a light receiving element receiving light reflected by an object irradiated with light from the light emitting element, and optically detects whether or not there is an object that is in proximity thereto. For example, the light emitting element is a light emitting diode having directivity, a laser diode, or the like, and the light receiving element is a photodiode, a phototransistor, or the like. One or more light emitting elements and one or more light receiving elements are integrally installed on the periphery of an electronic device or the like to detect an operation object of a user that is in proximity to the electronic device. The electronic device in which the proximity detection device is installed is not particularly limited, but the electronic device is, for example, a touch panel display. When the proximity of the operation object of the user is detected, the electronic device detects a gesture operation such as a swipe.

Figure 8A:
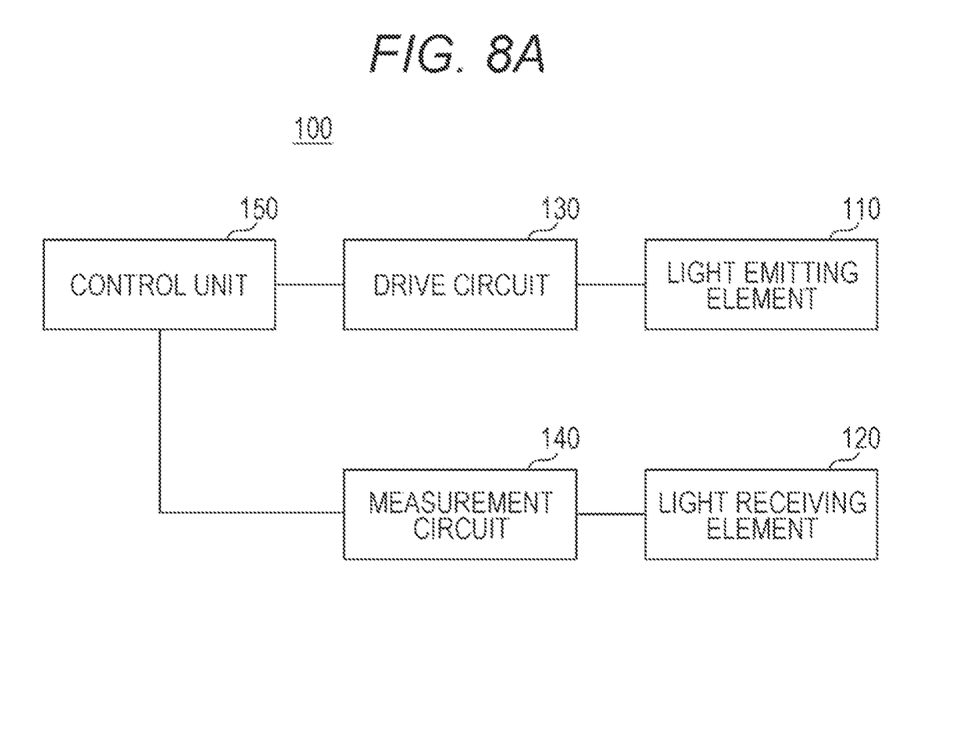
FIG. 8A is a block diagram illustrating one form of an electrical configuration of a proximity detection device according to the present disclosure.

Next, one form of a proximity detection device according to some implementations of the present disclosure will be described. FIG. 8A is a block diagram illustrating an electrical configuration of the proximity detection device according to one form of the present disclosure. The proximity detection device 100 includes a plurality of light emitting elements 110, a plurality of light receiving elements 120, a drive circuit 130 driving the light emitting elements 110, a measurement circuit 140 measuring reflected light received by the light receiving elements 120, and a control unit 150 entirely controlling the proximity detection device 100.

The proximity detection device 100 is mounted, for example, on an in-vehicle display 1, as illustrated in FIG.

1B, to detect whether or not there is an operation object of a user that is in proximity to the display 1. The light emitting elements 110 include light emitting elements LED1 to LED4 disposed in a lower portion 3 of the display 1, and the light receiving elements 120 include a light receiving element PD1 disposed between the light emitting elements LED1 and LED2 and a light receiving element PD2 disposed between the light emitting elements LED3 and LED4. As illustrated in FIG. 2, the drive circuit 130 sequentially drives the light emitting elements LED1 to LED4 so that the light emissions of the light emitting elements LED1 to LED4 do not overlap each other during a cycle period. During the cycle period, the measurement circuit 140 measures a detection level of reflected light received by the light receiving element PD1 when the light emitting element LED1 emits light (LED1→PD1), measures a detection level of reflected light received by the light receiving element PD1 when the light emitting element LED2 emits light (LED2→PD1), measures a detection level of reflected light received by the light receiving element PD2 when the light emitting element LED3 emits light (LED3→PD2), and measures a detection level of reflected light received by the light receiving element PD2 when the light emitting element LED4 emits light (LED4→PD2).

The control unit 150 determines whether or not there is an operation object that is in proximity to the display 1 on the basis of measurement results of the measurement circuit 140, estimates a horizontal position of the operation object on the basis of a distribution of the detection levels of the light receiving elements PD1 and PD2 measured in the cycle, and determines a gesture operation such as a swipe from the estimation result. The control unit 150 may be a part of a display controller controlling a display on the display 1, or may be provided separately from the display controller and operate in cooperation with the display controller. For example, when a swipe operation is detected by the control unit 150, the display controller can control a display (for example, a display of a menu screen, a display of a next page screen, or the like) according to the detection. The control unit 150 is implemented using hardware and software. The control unit 150 includes, for example, a microcontroller including a ROM/RAM, a microprocessor, a memory, and the like, and executes a program stored in the ROM or the memory.

The proximity detection device 100 provides a means for preventing an increase in erroneous detection when the screen of the display 1 is operated on a lower portion thereof as illustrated in FIG. 7C and reducing an error in estimated position caused due to light reflected by an arm portion 4A when a driver operates the screen of the display 1 on an upper portion thereof on the front passenger's seat side as illustrated in FIG. 7B.

Figure 8B:
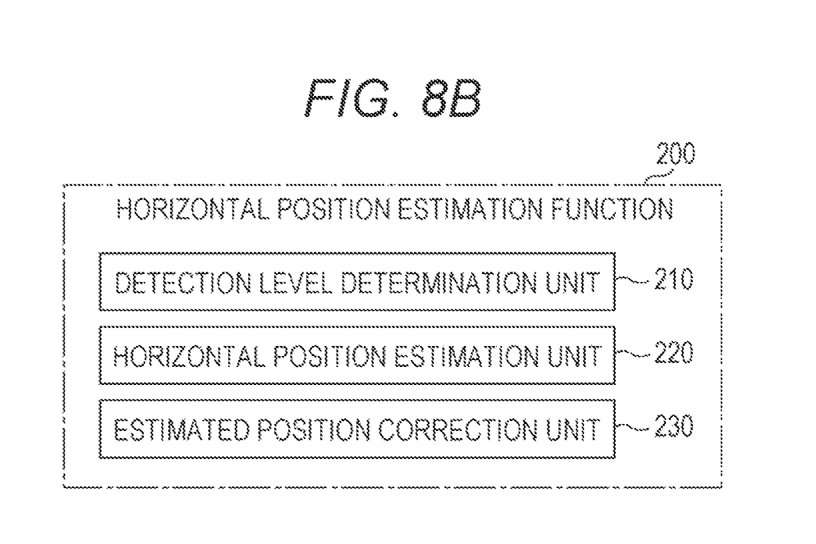
FIG. 8B is a diagram illustrating one form of a configuration for a gesture determination function included in a control unit.

FIG. 8B is a diagram illustrating one form of a configuration for a horizontal position estimation function 200 included in the control unit 150. The horizontal position estimation function 200 includes a detection level determination unit 210 determining whether or not there is a detection object that can be a detection target in front of the display 1 from the measured detection levels, a horizontal position estimation unit 220 estimating a horizontal position of the detection object when the detection level determination unit 210 determines that there is a detection object that can be a detection target, and an estimated position correction unit 230 correcting the estimated position estimated by the horizontal position estimation unit 220. The estimated position correction unit 230 reduces an error in estimated position when the driver operates the screen at a position far away from the driver on the front passenger's seat side as illustrated in FIGS. 7B and 7C.

Figure 9:
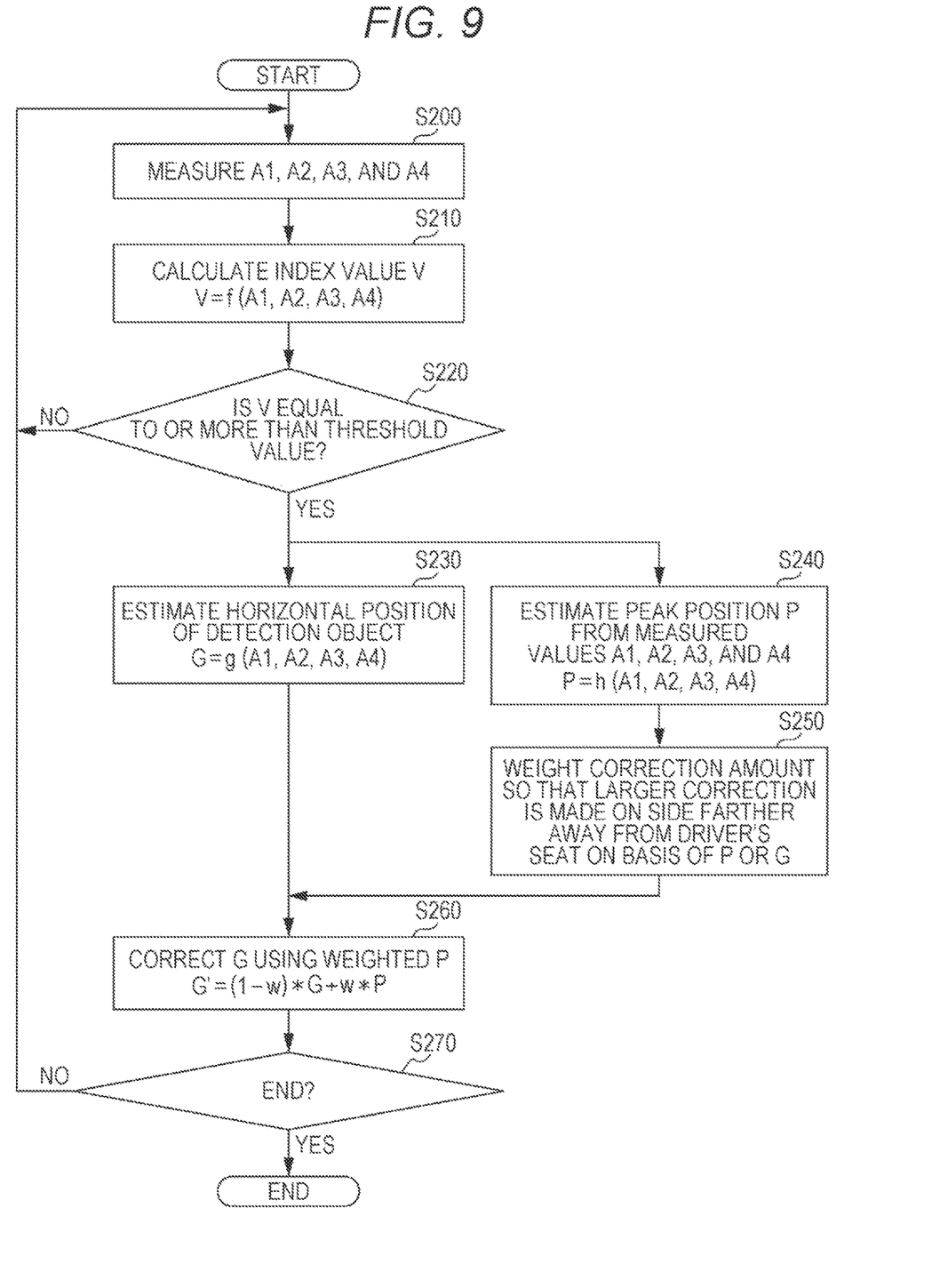
FIG. 9 is a flowchart illustrating one form of a method of correcting an estimated position according to the present disclosure.

One form of an algorithm of the horizontal position estimation function 200 will be described with reference to a flowchart illustrated in FIG. 9. Steps S200 to S230 in the flowchart of FIG. 9 are the same as steps S100 to S130 in the flowchart of FIG. 5, and the present implementation further includes steps S240 to S260.

The light emitting elements LED1, LED2, LED3, and LED4 are sequentially driven by the drive circuit 130, and detection levels of light received by the light receiving elements PD1 and PD2 at that time are measured by the measurement circuit 140 as measured values A1, A2, A3, and A4 (S200). The detection level determination unit 210 calculates an index value V for evaluating whether or not there is a detection object sufficient for performing position determination on the basis of the measured values A1 to A4 (S210). The index value V may be calculated as, for example, a maximum value of the measured values A1, A2, A3, and A4.

When the index value V is more than a threshold value (S220), the horizontal position estimation unit 220 determines that there is a meaningful detection object, and calculates an estimated position G of the detection object using the above-described Equation (1) or (2) (S230). When the index value V is less than the threshold value, position estimation is not performed, and the process returns to a next measurement.

When the index value V is equal to or more than the threshold value, the estimated position correction unit 230 further estimates a peak position P from the measured values A1 to A4 (S240). The peak position P is used to determine a correction amount of the estimated position G. As will be described later, the correction amount varies, depending on a weighting coefficient, to increase on the front passenger's seat side and to decrease on the driver's seat side. As a way of estimating the peak position P, the peak position P may be simply a position corresponding to the maximum measured value (a position at the maximum detection level) among the measured values A1 to A4. For example, the peak position P may be 1 when the measured value A1 is maximum, the peak position P may be 2 when the measured value A2 is maximum, the peak position P may be 3 when the measured value A3 is maximum, and the peak position P may be 4 when the measured value A4 is maximum. Alternatively, the second largest measured value closest to the maximum measured value may be obtained, and a weighting average therebetween may be obtained. For example, according to the equation P=(A1×[x1]+A2×[x2])/(A1+A2) obtained in a case where the measured value A1=2000 is maximum and the measured value A2=700 is second largest, by weighting a coordinate x1 of a horizontal position corresponding to the measured value A1 as 1 and weighting a coordinate x2 of a horizontal position corresponding to the measured value A2 as 2, (2000×1+700×2)/(2000+700)=1.26 can be obtained.

Next, the estimated position correction unit 230 determines a weighting coefficient w for correcting the estimated position G based on the peak position P obtained as described above (S250). Assuming that the light emitting element closest to the driver's seat is LED4, the correction amount is weighted so that a larger correction is made as the estimated position G is closer to the coordinate x1. For example, assuming that a weighting coefficient w is 0.8 (w=0.8) when the peak position P is 1, a weighting coefficient w is 0.2 (w=0.2) when the peak position P is 4, and a weighting coefficient therebetween is obtained by linear interpolation, a weighting coefficient w is 0.75 (w=0.75) in the above-described example (peak position P=1.26).

The estimated position correction unit 230 corrects the estimated position G according to the weighted peak position P and calculates a corrected position G' (S260). The corrected position G' is calculated by the following equation.

$$G'=(1-w)\times G+w\times p$$

In the first term [(1−w)×G] of the above equation, a correction amount for decreasing the estimated position G is larger as the estimated position G is closer to the driver's seat side, and in the second term [w×P] of the above equation, a correction amount for increasing the peak position P is larger as the peak position P is closer to the driver's seat side.

The estimated position G obtained as 1.81 according to the centroid calculation is corrected to G'=(1−w)×G+w×P=0.25×1.81+0.75×1.26=1.40 according to the above calculating equation, and the corrected estimated position G'=1.40 is a value close to the original estimated position as 1.33.

Figure 10A:
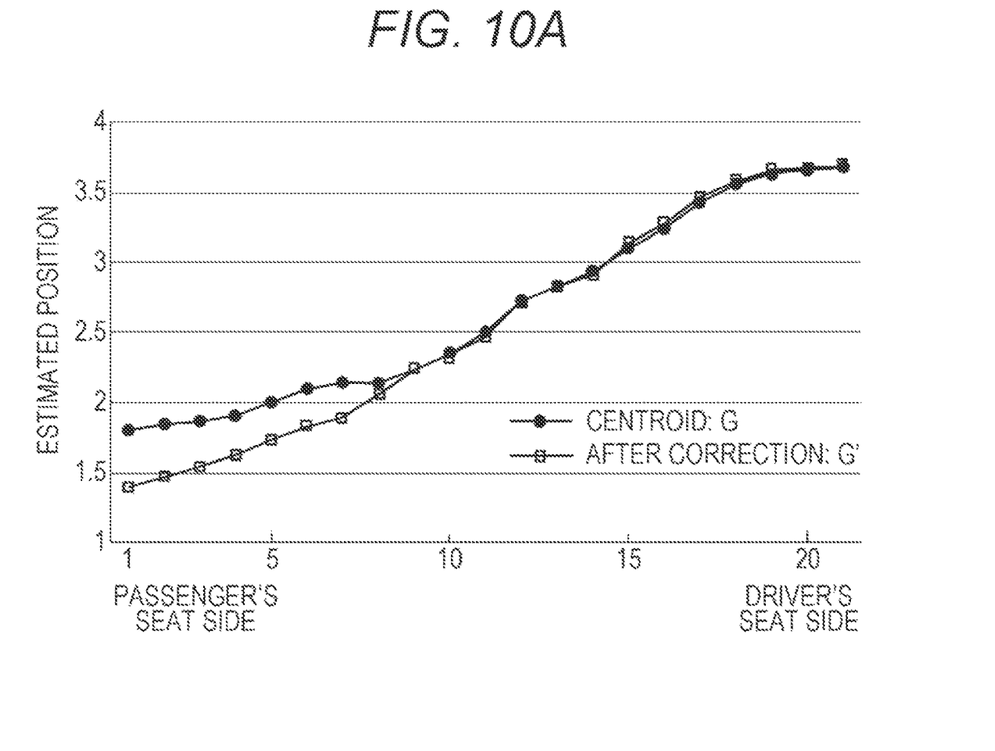
FIGS. 10A and 10B are graphs illustrating an effect of one form of the correction method according to present disclosure.
Figure 10B:
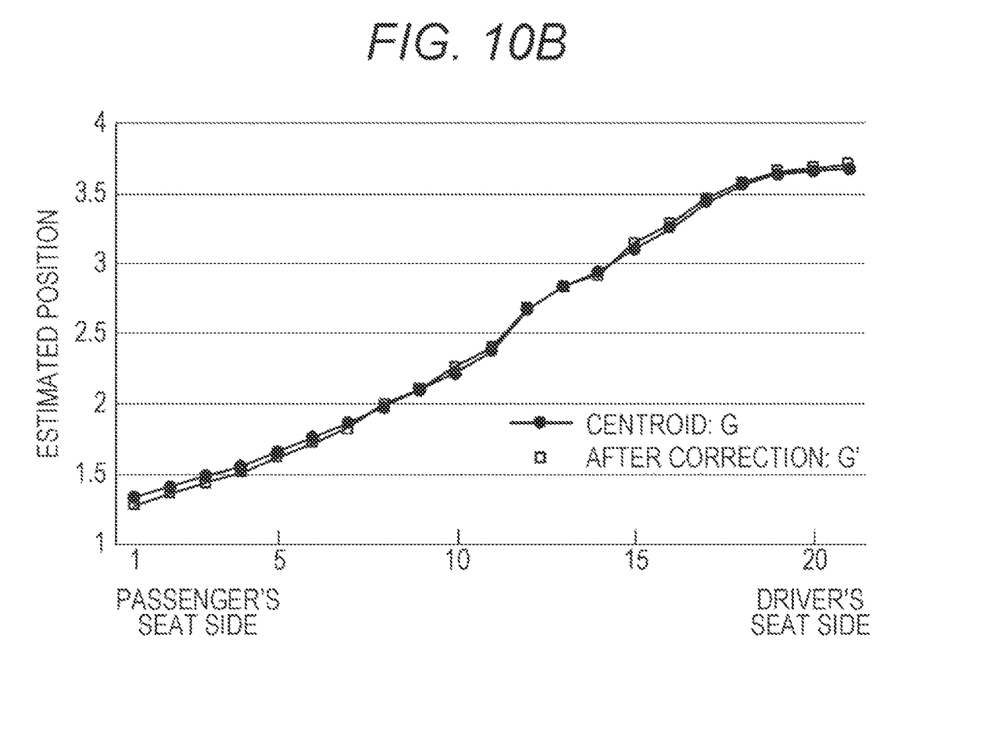

FIGS. 10A and 10B are graphs each illustrating an example in which the estimated position is corrected using the horizontal position estimation function 200. FIG. 10A illustrates an estimated position obtained when the screen of the display 1 is swiped on the upper portion thereof from the front passenger's seat side to the driver's seat side, and FIG. 10B illustrates an estimated position obtained when the screen of the display 1 is swiped on the lower portion thereof from the front passenger's seat side to the driver's seat side. A line represented by • indicates an estimated position G according to the conventional centroid calculation, and a line represented by □ indicates a corrected estimated position G' according to the presently described implementations.

Concerning the estimated position G according to the centroid calculation in FIG. 10A, when the screen is operated on the upper portion thereof, the estimated position at the time of operation on the front passenger's seat side is high due to the influence of reflection by the arm portion (an error occurs on the driver's seat side). In contrast, concerning the corrected estimated position G' according to the present embodiment, it can be seen that the estimated position is smoothly corrected while being suppressed to be low.

In addition, when the screen is operated on the lower portion thereof as illustrated in FIG. 10B, since the influence of reflection by the arm portion is originally small, a correct position can be estimated by the conventional calculation method. However, it can be seen that even though a correction is made according to the presently described implementations, the corrected estimated position G' approximates the estimated position G without being excessively different therefrom, and the estimated position is kept smooth.

In this way, according to the estimated position correction method of the presently described implementations, in a case where the screen is operated at a position far away from the driver's seat, when the screen is operated on the upper portion thereof, an error caused due to the reflection by the driver's arm portion is suppressed while continuity is smoothly maintained without extremely distorting the corrected estimated position. On the other hand, when the screen is operated on the lower portion thereof, where the influence of the arm portion is small, the estimated position is not excessively corrected, and thus, an operation of an air conditioner disposed below the display or the like is not erroneously detected and a swipe operation or the like as intended by the user can be detected.

Furthermore, according to implementations of the correction method of the present disclosure, since it is not necessary to add hardware for determining an operation of the screen on the upper or lower portion thereof, it is possible to substantially suppress an increase in cost of the proximity detection device.

Although implementations of the present disclosure have been described in detail above, the present disclosure is not limited to the specific implementations, and various modifications and changes can be made within the scope of the gist of the disclosure set forth in the claims.

It is intended that the foregoing detailed description be regarded as illustrative rather than limiting, and that it be understood that it is the following claims, including all equivalents, that are intended to define the spirit and scope of this disclosure.

What is claimed is:

1. A proximity detection device configured to detect an object that is in proximity thereto using a plurality of light emitting elements and light receiving elements receiving reflected light obtained by reflection of irradiation light from corresponding light emitting elements of the plurality of light emitting elements by the object, the proximity detection device comprising:

a drive unit configured to sequentially drive the light emitting elements of the plurality of light emitting elements, where the light emitting elements of the plurality of light emitting elements are arranged linearly in a horizontal direction;

a measurement unit configured to measure detection levels of the light receiving elements when the light emitting elements of the plurality of light emitting elements sequentially emit light, respectively;

an estimation unit configured to estimate a position of the object in the horizontal direction on the basis of a plurality of measurement results of the measurement unit, wherein the estimation unit is configured to calculate the estimated position by calculating a centroid between horizontal coordinates detected by respective detection levels of the plurality of light emitting elements and the plurality of measurement results of the measurement unit; and a correction unit configured to correct the position estimated by the estimation unit, wherein the correction unit is configured to correct the estimated position so that a larger correction is made as the estimated position is closer to one side in the horizontal direction, and so that a smaller correction is made as the estimated position is closer to the other side in the horizontal direction that is opposite to the one side;

wherein the correction unit is configured to calculate a peak position of the detection levels on the basis of the measurement results of the measurement unit, such that the estimated position is corrected on the basis of the calculated peak position;

wherein the correction unit is configured to determine a weighting coefficient so that a correction amount based on the peak position is larger as the peak position is closer to the one side and is smaller as the peak position is closer to the other side; and wherein the correction unit is configured to correct the estimated position according to (1−w)×G+w×P, where w is the weighting coefficient, G is the estimated position, and P is the peak position.

2. The proximity detection device according to claim 1, wherein:
the plurality of light emitting elements and light receiving elements are disposed in a lower portion of a touch panel display,
the light receiving elements include a first light receiving element disposed between first and second light emitting elements and a second light receiving element disposed between third and fourth light emitting elements, and
the measurement unit is configured to measure detection levels of the first light receiving element when the first and second light emitting elements emit light, respectively, and measures detection levels of the second light receiving element when the third and fourth light emitting elements emit light, respectively.

3. The proximity detection device according to claim 2, wherein the display is disposed between a driver's seat and a front passenger's seat, and the one side is a front passenger's seat side and the other side is a driver's seat side.

4. A proximity detection device configured to detect an object that is in proximity thereto using a plurality of light emitting elements and light receiving elements receiving reflected light obtained by reflection of irradiation light from corresponding light emitting elements of the plurality of light emitting elements by the object, the proximity detection device comprising:
a drive unit configured to sequentially drive the light emitting elements of the plurality of light emitting elements, where the light emitting elements of the plurality of light emitting elements are arranged linearly in a horizontal direction;
a measurement unit configured to measure detection levels of the light receiving elements when the light emitting elements of the plurality of light emitting elements sequentially emit light, respectively;
an estimation unit configured to estimate a position of the object in the horizontal direction on the basis of a plurality of measurement results of the measurement unit, wherein the estimation unit is configured to calculate the estimated position by calculating a centroid between horizontal coordinates detected by respective detection levels of the plurality of light emitting elements and the plurality of measurement results of the measurement unit; and
a correction unit configured to correct the position estimated by the estimation unit;
wherein the correction unit is configured to correct the estimated position so that a larger correction is made as the estimated position is closer to one side in the horizontal direction, and so that a smaller correction is made as the estimated position is closer to the other side in the horizontal direction that is opposite to the one side;
wherein the correction unit is configured to calculate a peak position of the detection levels on the basis of the measurement results of the measurement unit, such that the estimated position is corrected on the basis of the calculated peak position; and
wherein the correction unit is configured to correct the estimated position according to $(1-w) \times G + w \times P$, where $w$ is the weighting coefficient, $G$ is the estimated position, and $P$ is the peak position.

5. A proximity detection device configured to detect an object that is in proximity thereto using a plurality of light emitting elements and light receiving elements receiving reflected light obtained by reflection of irradiation light from corresponding light emitting elements of the plurality of light emitting elements by the object, the proximity detection device comprising:
a drive unit configured to sequentially drive the light emitting elements of the plurality of light emitting elements, where the light emitting elements of the plurality of light emitting elements are arranged linearly in a horizontal direction;
a measurement unit configured to measure detection levels of the light receiving elements when the light emitting elements of the plurality of light emitting elements sequentially emit light, respectively;
an estimation unit configured to estimate a position of the object in the horizontal direction on the basis of a plurality of measurement results of the measurement unit, wherein the estimation unit is configured to calculate the estimated position by calculating a centroid between horizontal coordinates detected by respective detection levels of the plurality of light emitting elements and the plurality of measurement results of the measurement unit; and
a correction unit configured to correct the position estimated by the estimation unit,
wherein the correction unit is configured to correct the estimated position so that a larger correction is made as the estimated position is closer to one side in the horizontal direction, and so that a smaller correction is made as the estimated position is closer to the other side in the horizontal direction that is opposite to the one side; and
wherein the correction unit is configured to correct the estimated position according to $(1-w) \times G + w \times P$, where $w$ is the weighting coefficient, $G$ is the estimated position, and $P$ is the peak position.

* * * * *